(12) United States Patent
Kelly et al.

(10) Patent No.: US 11,878,794 B2
(45) Date of Patent: Jan. 23, 2024

(54) AIRCRAFT WING TRAILING EDGE SECTION ASSEMBLY

(71) Applicant: Airbus Operations Limited, Bristol (GB)

(72) Inventors: Peter Kelly, Bristol (GB); Mark Shaun Kelly, Bristol (GB); Stuart Strachan Alexander, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 17/656,110

(22) Filed: Mar. 23, 2022

(65) Prior Publication Data

US 2022/0306276 A1 Sep. 29, 2022

(30) Foreign Application Priority Data

Mar. 24, 2021 (GB) ..................................... 2104094

(51) Int. Cl.
*B64C 3/48* (2006.01)
*B64C 3/28* (2006.01)
*B64C 3/44* (2006.01)

(52) U.S. Cl.
CPC .................. *B64C 3/48* (2013.01); *B64C 3/28* (2013.01); *B64C 2003/445* (2013.01)

(58) Field of Classification Search
CPC .............................. B64C 3/48; B64C 2003/445
See application file for complete search history.

(56) References Cited

U.S. PATENT DOCUMENTS

| 1,790,309 | A | * | 1/1931 | Kientz | ...................... B64C 3/48 |
| | | | | | 244/219 |
| 3,716,209 | A | | 2/1973 | Pierce | |
| 3,954,230 | A | * | 5/1976 | Machuta | ................. F02K 1/002 |
| | | | | | 416/240 |

(Continued)

FOREIGN PATENT DOCUMENTS

| CN | 211252992 | | 8/2020 | |
| CN | 112339990 | A * | 2/2021 | ............. B64C 3/385 |

(Continued)

OTHER PUBLICATIONS

Combined Search and Examination Report for GB2104094.4, dated Aug. 11, 2021, 8 pages.

*Primary Examiner* — Joseph W Sanderson
(74) *Attorney, Agent, or Firm* — Nixon & Vanderhye P.C.

(57) ABSTRACT

An aircraft wing trailing edge section assembly is disclosed having an upper skin structure providing an upper external aerodynamic trailing edge surface, a lower skin structure providing a lower external aerodynamic trailing edge surface, and a movement mechanism including a first portion attached to an internal surface of the upper skin structure, a second portion attached to an internal surface of the lower skin structure, and a rotationally mounted connector member connected between the first and second portions, such that rotational movement of the connector member causes simultaneous movement of both first and second portions and therefore both upper and lower skin structures, such that the camber of the trailing edge section is changed. An aircraft wing section assembly, an aircraft and methods of operating an aircraft are disclosed.

16 Claims, 4 Drawing Sheets

(56) References Cited

U.S. PATENT DOCUMENTS

| | | | | |
|---|---|---|---|---|
| 4,252,287 A | * | 2/1981 | Zimmer | B64C 3/48 244/214 |
| 4,341,176 A | * | 7/1982 | Orrison | B63H 9/061 114/127 |
| 4,349,169 A | | 9/1982 | McAnally | |
| 5,004,189 A | * | 4/1991 | Igram | B64C 3/48 244/219 |
| 5,288,039 A | * | 2/1994 | DeLaurier | B64C 3/52 244/90 R |
| 5,839,700 A | | 11/1998 | Nedderman, Jr. | |
| 5,887,828 A | * | 3/1999 | Appa | B64C 9/18 244/90 R |
| 6,010,098 A | * | 1/2000 | Campanile | B64C 3/48 244/99.8 |
| 6,045,096 A | * | 4/2000 | Rinn | B64C 3/48 244/219 |
| 6,276,641 B1 | * | 8/2001 | Gruenewald | B64C 3/48 244/219 |
| 6,481,667 B1 | * | 11/2002 | Ho | B64C 9/08 244/99.11 |
| 6,491,262 B1 | | 12/2002 | Kota | |
| 7,108,231 B2 | * | 9/2006 | Perez-Sanchez | B64C 9/02 244/99.5 |
| 7,384,016 B2 | | 6/2008 | Kota et al. | |
| 9,944,356 B1 | * | 4/2018 | Wigley | B64C 3/48 |
| 11,111,004 B2 | * | 9/2021 | Sarraf | B64C 3/48 |
| 11,192,635 B2 | * | 12/2021 | Bentivoglio | B64C 9/02 |
| 11,377,196 B2 | * | 7/2022 | Shields | B64C 3/52 |
| 11,519,275 B1 | * | 12/2022 | Neely | B64C 3/48 |
| 2005/0103945 A1 | * | 5/2005 | Perez-Sanchez | B64C 3/48 244/218 |
| 2013/0206918 A1 | | 8/2013 | Fischer et al. | |
| 2019/0084666 A1 | | 3/2019 | Bentivoglio et al. | |
| 2019/0152581 A1 | * | 5/2019 | Davis | B64C 9/02 |
| 2020/0130808 A1 | * | 4/2020 | Sarraf | B64C 13/28 |
| 2021/0245862 A1 | * | 8/2021 | Shields | B64C 3/48 |
| 2022/0250736 A1 | * | 8/2022 | Kelly | B64C 3/50 |
| 2023/0089911 A1 | * | 3/2023 | Berry | B64C 3/48 |

FOREIGN PATENT DOCUMENTS

| | | | | |
|---|---|---|---|---|
| CN | 112340016 A | * | 2/2021 | B64C 3/385 |
| DE | 4334496 A1 | * | 4/1995 | B63B 1/286 |
| DE | 10 2008 022 422 | | 11/2009 | |
| DE | 102010028490 A1 | * | 11/2011 | B64C 3/48 |

* cited by examiner

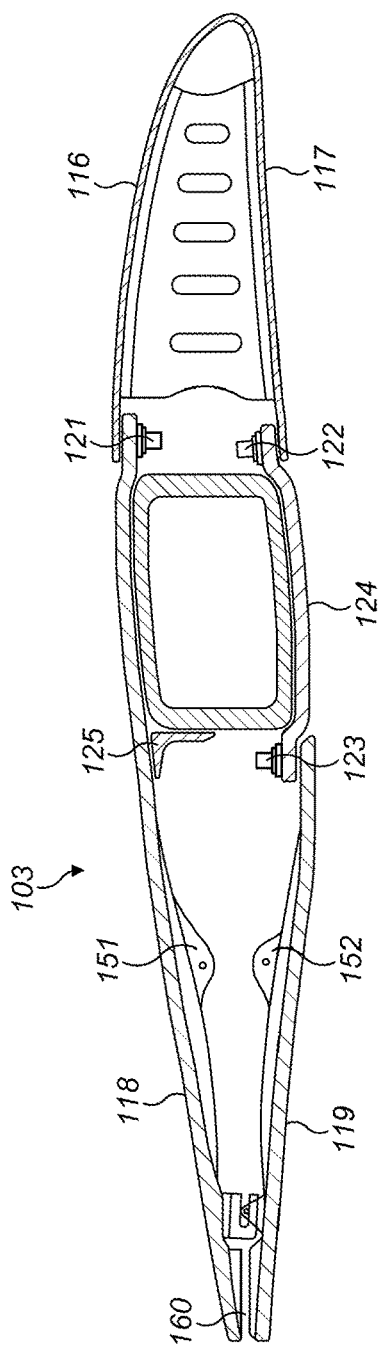
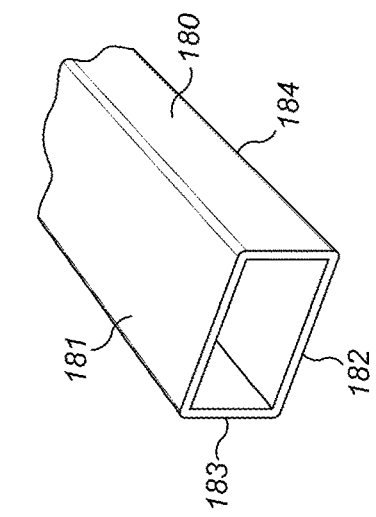
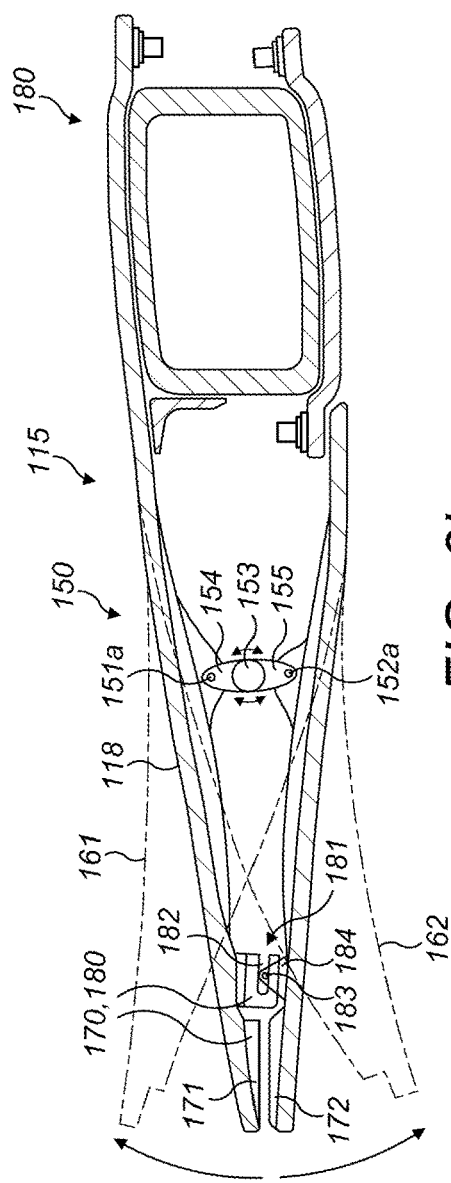
FIG. 3a
FIG. 3b
FIG. 3c

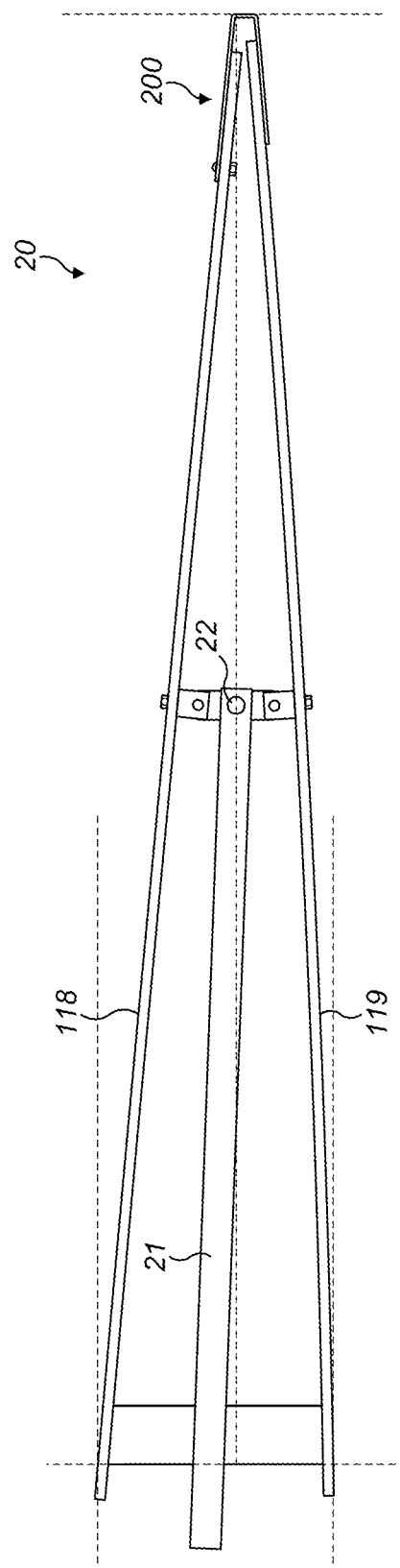
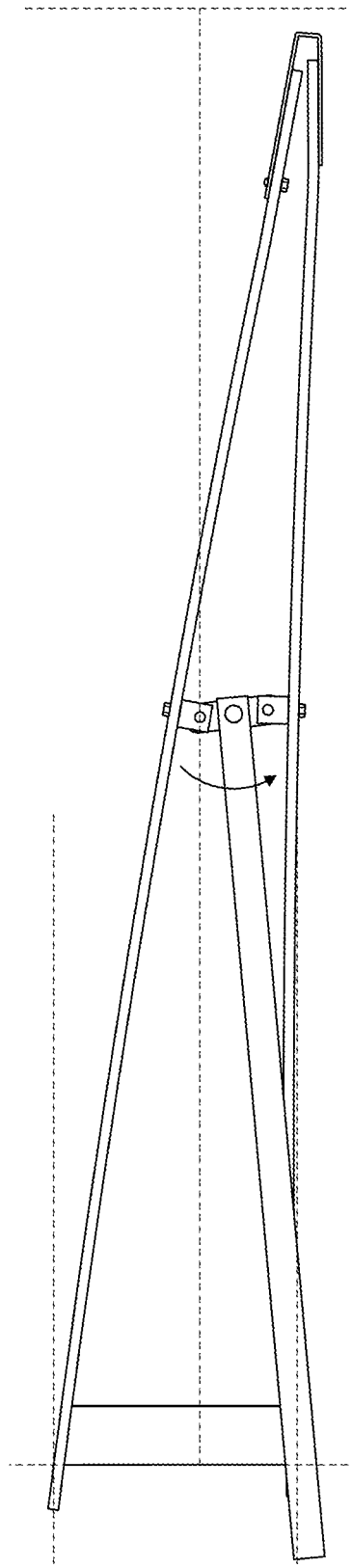

AIRCRAFT WING TRAILING EDGE SECTION ASSEMBLY

CROSS RELATED APPLICATION

This application claims priority to United Kingdom Patent Application GB 2104094.4, filed Mar. 24, 2021, the entire contents of which is hereby incorporated by reference.

BACKGROUND OF THE INVENTION

The present disclosure relates to an aircraft wing trailing edge section assembly.

The present invention concerns aircraft wing trailing edge section assemblies. More particularly, but not exclusively, this invention concerns an aircraft wing trailing edge section assembly comprising an upper skin structure providing an upper external aerodynamic trailing edge surface, a lower skin structure providing a lower external aerodynamic trailing edge surface, and a movement mechanism for causing simultaneous movement of both upper and lower skin structures, such that the camber of the trailing edge section is changed.

The invention also concerns an aircraft wing section assembly, an aircraft and methods of operating an aircraft.

U.S. Pat. No. 7,384,016 discloses an arrangement that changes the contour of upper and lower surfaces of a trailing edge section of an aircraft wing. The way it does this is using two sliding actuators working in a push-pull manner.

US 2013206918 discloses an auxiliary flap arrangement for a trailing edge of an aircraft wing. The auxiliary flaps on the upper and lower surfaces are moved using lever kinematics or telescoping mechanisms.

However, it may be that a different or an improved mechanism is desired. For example, one might consider that the reliability of the sliding mechanisms could be improved upon.

In addition, the arrangements here take up a lot of space within the wing section. This may not always be acceptable.

For example, high aspect ratio (wing span divided by mean chord) wings (i.e. long and slender wings with an aspect ratio of 12 or more) are important as they reduce induced drag and so increase fuel burn efficiency, and so reduce operating costs and environmental impact. However, high aspect wings are torsionally flexible and may require movable trailing edge devices located very near the tip of the wing. They also may require both upper and lowers trailing edges surfaces to be moved in order to achieve the required roll responsiveness and/or wing tip load alleviation from the control surfaces. It is also important to ensure the control surfaces are large enough to overcome any potential "aileron reversal" effects that may otherwise occur.

However, in high aspect ratio wings, there is often little space in the wing (especially the wing tip, for example a foldable wing tip) for the actuation mechanism of a suitable trailing edge section. Hence, the arrangements of U.S. Pat. No. 7,384,016 and US 2013206918 may not be suitable for such applications.

The present invention seeks to mitigate the above-mentioned problems.

Alternatively or additionally, the present invention seeks to provide an improved an aircraft wing trailing edge section assembly.

SUMMARY OF THE INVENTION

The present invention provides, according to a first aspect, an aircraft wing trailing edge section assembly comprising an upper skin structure providing an upper external aerodynamic trailing edge surface, a lower skin structure providing a lower external aerodynamic trailing edge surface, and a movement mechanism comprising a first portion attached to an internal surface of the upper skin structure, a second portion attached to an internal surface of the lower skin structure, and a rotationally mounted connector member connected between the first and second portions, such that rotational movement of the connector member causes simultaneous movement of both first and second portions and therefore both upper and lower skin structures, such that the camber of the trailing edge section is changed.

This provides an effective (double) mechanism for actuating movement of both the upper and lower trailing edge surfaces and so provide an effective, and compact, mechanism for changing the camber of the trailing edge section.

The upper and lower skin structures may be flexible. In other words, they are able to bend and flex relative to the rest of the wing section, to adjust the camber.

The upper and lower skin structures may have a tailored panel stiffness to provide this desired flexibility.

For example, in a neutral position, the aerodynamic load is reacted across the upper and lower skin structures and movement mechanism. In a deflected position, the connector member applies an additional moment, which results in the deflected shape and in which the aerodynamic loads are reacted and the deflected shape is maintained.

Each skin structure needs to be able to withstand an aerodynamic load to a defined maximum deflection. The force then applied by the connector member is greater than the aerodynamic load reaction and therefore changes the shape of the skin structures by deforming them.

A certain rotation angle of the connector member may correspond proportionally to a skin structure deflection.

The connector member may be mounted to rotate +/− from a neutral position by at least 5 degrees and preferably at least 8 degrees. This may correspond to a trailing edge deflection +/− from a neutral position by at least 10 mm, preferably at least 15 mm or 20 mm. This may correspond to a trailing edge rotation +/− from a neutral position by at least 10 degrees, and preferably at least 15 degrees.

For example, an approximate +/−9 degree rotation angle of the connector member may result in an approximate +/−25 mm deflection of the trailing edge. This may correspond to an approximate +/−20 degree rotation of the trailing edge.

This provides the change in camber in a more smooth and continuous manner and hence reduces the twisting moment on the primary structure (for example, the wing box).

This also reduces or eliminates the need for a control surface hinge (for example, a hinge to mount an aileron to the wing or wing tip). Instead, the moveable upper and lower skin structures may be structurally integrated/attached to the wing box, which provides additional torsional stiffness to the wing. It also reduces part count, complexity and cost.

It also reduces or eliminates the need for holes/gaps/fasteners on the upper surface, especially. This provides a clean aerodynamic profile.

It also removes or minimises the need for aerodynamic seals, which are subject to wear, deformation and reduction in local aerodynamic performance.

This provides a very effective (double) movement mechanism.

It is rotational movement of the connector member that causes the movement of the first and second portions. This provides an especially compact arrangement that may be especially suitable for use in high aspect ratio wings and/or wing tips (for example, within foldable wing tips). It also enables movement to be actuated at various points along the span (by the connector member). For example, the connector member may cause simultaneous movement of a number of pairs of first and second portions along the wing or wing tip span. This reduces the twisting of the wing/wing tip and prevents "aileron reversal" effects.

Rotation of the connector member in a clockwise direction may cause the first portion and second portion to move in opposite directions to each other. Rotation of the connector member in an anti-clockwise direction causes the first portion and second portion to move in opposite directions to each other, but in reverse directions (compared to rotation of the connector member in the clockwise direction).

The connector member may be rotationally mounted to another part of the wing section. The rotational mounting may be in a central portion of the connector member.

The connector member may be connected at a first end to the first portion. The connector member may be connected at a second, opposite end to the second portion. The connector member may be substantially vertical in relation to a horizontal flight orientation of the aircraft wing trailing edge section assembly. The connector member may be substantially vertical when in a neutral position. The neutral position may correspond to a normal/neutral camber of the trailing edge section (for example, the camber used in cruise).

The connector member may be moveable between two extreme positions; one providing a downwards camber of the trailing edge region and the other providing an upwards camber of the trailing edge region. The neutral position of the connector member may be approximately halfway between the two extreme positions.

The first portion may be fixedly attached to the internal surface of the upper skin structure. For example, the first portion may be integral with the upper skin structure. The second portion may be fixedly attached to the internal surface of the lower skin structure. For example, the second portion may be integral with the lower skin structure.

The aircraft wing trailing edge section assembly may be or may comprise an aircraft wing tip trailing edge section assembly. In other words, the assembly may be for use in a wing tip. It may be for use in a folding wing tip, foldable in relation to a main wing section assembly.

The overall wing may be a high aspect ratio (wing span divided by mean chord) wing (i.e. long and slender) with an aspect ratio of 12 or more.

Preferably, the connector member is pivotally connected to the first and second portions.

Hence, the first and second portions and upper and lower skin structures are not constrained rotationally to the connector member. This allows them to flex and bend.

Preferably, movement of the connector member causes the first portion to move in a first direction and the second portion to move in a second, opposite direction.

These directions may be substantially fore and aft in relation to the horizontal flight orientation of the aircraft wing trailing edge section assembly.

If the connector member causes the first portion to move aft, this causes the upper skin surface to be effectively pulled away from where it is attached to the rest of the wing (e.g. at the top of the rear spar/wing box). However, as the upper skin is somewhat bendy/flexible but is designed not to stretch/elongate (i.e. retain its same length), instead the first portion pulls the upper skin upwards towards being level with its connection to the rest of the wing (e.g. at the top of the rear spar/wing box). This allows the first portion to move aftwards relative to the rest of the wing, without the upper skin being elongated.

If the connector member causes the first portion to move fore, this causes the upper skin surface to be effectively pushed towards where it is attached to the rest of the wing (e.g. at the top of the rear spar/wing box). However, as the upper skin is designed not to crumple/compress (i.e. retain its same length), instead the first portion pushes the upper skin downwards away from its connection to the rest of the wing (e.g. at the top of the rear spar/wing box). This allows the first portion to move forwards relative to the rest of the wing, without the upper skin being compressed.

If the connector member causes the second portion to move aft, this causes the lower skin surface to be effectively pulled away from where it is attached to the rest of the wing (e.g. at the bottom of the rear spar/wing box). However, as the lower skin is designed not to stretch/elongate (i.e. retain its same length), instead the second portion pulls the lower skin downwards towards being level with its connection to the rest of the wing (e.g. at the bottom of the rear spar/wing box). This allows the second portion to move aftwards relative to the rest of the wing, without the lower skin being elongated.

If the connector member causes the second portion to move fore, this causes the lower skin surface to be effectively pushed towards where it is attached to the rest of the wing (e.g. at the bottom of the rear spar). However, as the lower skin is designed not to crumple/compress (i.e. retain its same length), instead the second portion pushes the lower skin upwards away from its connection to the rest of the wing (e.g. at the bottom of the rear spar). This allows the second portion to move forwards relative to the rest of the wing, without the lower skin being compressed.

Hence, if the connector member causes the first portion to move aft and the second portion to move fore it can be seen that both upper and lower skins move upwards.

Hence, if the connector member causes the first portion to move fore and the second portion to move aft it can be seen that both upper and lower skins move downwards.

Preferably, the connector member extends along a span of the aircraft wing trailing edge section and wherein the aircraft wing trailing edge section includes a plurality of pairs of first and second portions attached to the upper and lower skin structures, distributed along the span of the aircraft wing trailing edge section and wherein the connector member is connected between each pair of first and second portions.

Hence, rotation of the connector member causes simultaneous movement of the pairs of first and second portions to enable the camber to be adjusted effectively over a span of the trailing edge section.

Preferably, the upper skin structure and the lower skin structure are spaced from each other at their respective tail ends. Providing a spacing between a tail end of the upper skin structure and a tail end of the lower skin structure avoids direct contact between the upper skin structure and lower skin structure. Preferably, the aircraft wing trailing edge section assembly further comprises a slide connection mechanism. Preferably, the slide connection mechanism forms the spacing between the respective tail ends of the upper skin structure and lower skin structure. Preferably, the slide connection mechanism includes a first slide part attached to the upper skin structure, and a second slide part attached to the lower skin structure, wherein the first and second slide parts are configured to allow relative movement between them in a first slide orientation and to constrain relative movement between them in a second perpendicular orientation.

The first slide orientation may be a fore-aft orientation. The second perpendicular orientation may be a substantially vertical and/or substantially horizontal orientation.

Importantly, the slide mechanism allows the upper and lower skin structures to slide in relation to each other whilst maintaining a closed trailing edge of the trailing edge section.

This removes or minimises the need for aerodynamic seals, which are subject to wear, deformation and reduction in local aerodynamic performance.

The first and/or second slide parts may comprise a low-friction coating, such as Teflon.

More preferably, the first and second slide parts form a slide channel and slider pair, the slider configured to slide within the slide channel.

The slider may be constrained to stay within the slide channel.

Preferably, the first and second slide parts are located on internal surfaces of the upper and lower skin structures and wherein the slide parts acts to pull the upper and lower skin structures towards each other.

Here, there may be provided a filler portion (or more than one filler portion) located in between the upper and lower skin structures at the trailing edge. The one or more filler portions may comprise a low-friction coating, such as Teflon.

Alternatively, the first and second slide parts are located on the upper and lower external aerodynamic trailing edge surfaces and wherein the slide parts acts to push the upper and lower skin structures towards each other.

Here, one of the first and second slide parts (for example, the slider) may comprise a cap that covers a gap between the upper and lower skin external aerodynamic trailing edge surfaces at the trailing edge. The cap may be metallic to aid with lighting strike issues.

There may also be provided a filler portion (or more than one filler portion) located in between the upper and lower skin structures fore of the trailing edge to maintain a certain spacing between them at that chordwise point. The one or more filler portions may comprise a low-friction coating, such as Teflon.

Preferably, the connector member is connected to an actuator, for actuating movement of the connector member.

The actuator may be an actuator rod. The actuator may be connected to the connector member at a first end. The actuator may be connected to an aircraft wing central section at a second opposite end. The aircraft wing central section is a wing section located more centrally (in relation to a chord of a wing) from the trailing edge section. In other words, it is fore (towards a leading edge section) from the trailing edge section. It may comprise a central wing box structure, for example including a rear spar of the central wing box. It may comprise a central wing box structure, for example a monolithic wing box. It may comprise a further skin structure located in between a central wing box structure and the upper and lower skin structures of the trailing edges section.

More preferably, the actuator is configured for attaching to an aircraft wing central section.

The aircraft wing central section is a wing section located more centrally (along a chord of a wing) from the trailing edge section. In other words, it is fore (towards a leading edge section) from the trailing edge section. It may comprise a central wing box structure, for example including a rear spar of a central wing box. It may comprise a central wing box structure, for example a monolithic wing box. It may comprise a further skin structure located in between a central wing box structure and the upper and lower skin structures of the trailing edges section.

This provides a rigidity to the arrangement. For example, the actuator, wing central section and upper skin structure form a "load bearing triangle". Similarly, for example, the actuator, wing central section and lower skin structure form a "load bearing triangle".

According to a second aspect of the invention there is also provided an aircraft wing section assembly, including the aircraft wing trailing edge section assembly as described above, and an aircraft wing central section, and wherein the actuator is attached to the aircraft wing central section.

The aircraft wing section assembly may be or may comprise an aircraft wing tip trailing edge section assembly. In other words, the assembly may be for use in a wing tip. It may be for use in a folding wing tip, foldable in relation to a main wing section assembly.

The overall wing may have a high aspect ratio (wing span divided by mean chord) wings (i.e. long and slender wings) with an aspect ratio of 12 or more.

Preferably, one of the upper and lower skin structures of the trailing edge section is integral to the aircraft wing central section and wherein the other of the upper and lower skin structures of the trailing edge section is removably attached to the aircraft wing central section.

The lower skin structure may be removably attached (e.g. by a bolt) to the aircraft wing central section. This aids assembly of the wing section assembly. It may be removably attached to a further skin structure located in between a central wing box structure and the lower skin structure of the trailing edges section.

According to a third aspect of the invention there is also provided an aircraft comprising the aircraft wing trailing edge section assembly or aircraft wing section assembly as described above.

The aircraft may have a high aspect ratio wing (wing span divided by mean chord) wings (i.e. long and slender wings) with an aspect ratio of 12 or more.

According to a fourth aspect of the invention there is also provided a method of operating an aircraft, the aircraft being as described above.

According to a fifth aspect of the invention there is also provided a method of operating an aircraft, comprising the following steps providing an upper skin trailing edge structure with an upper external aerodynamic trailing edge surface, and an internal surface, having a first portion attached to the internal surface, providing a lower skin trailing edge structure providing a lower external aerodynamic trailing edge surface, and an internal surface, having a second portion attached to the internal surface, and actuating movement of a connector member connected to the first and second portions, thereby causing movement of the first portion and the upper skin structure, movement of the second portion and lower skin structure, and the camber of the trailing edge section to change.

Preferably, the movement of the connector member causes the first portion to move in a first direction and the second portion to move in a second, opposite direction.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which:

FIG. 3a shows a cross-sectional side view of a tip portion of the wing of FIG. 2, with a trailing edge cambering device in a neutral configuration;

FIG. 3b shows the view of FIG. 3a additionally showing a torque tube arrangement and outlines of the upwards and downward configurations of the trailing edge device;

FIG. 3c shows a perspective view of the wing box structure of FIGS. 3a and 3b;

FIG. 4a shows an equivalent view to a cross-sectional side view, showing a test model in a neutral configuration;

FIG. 4b shows the test model of FIG. 4a in a downwards configuration;

DETAILED DESCRIPTION

Figure 1:
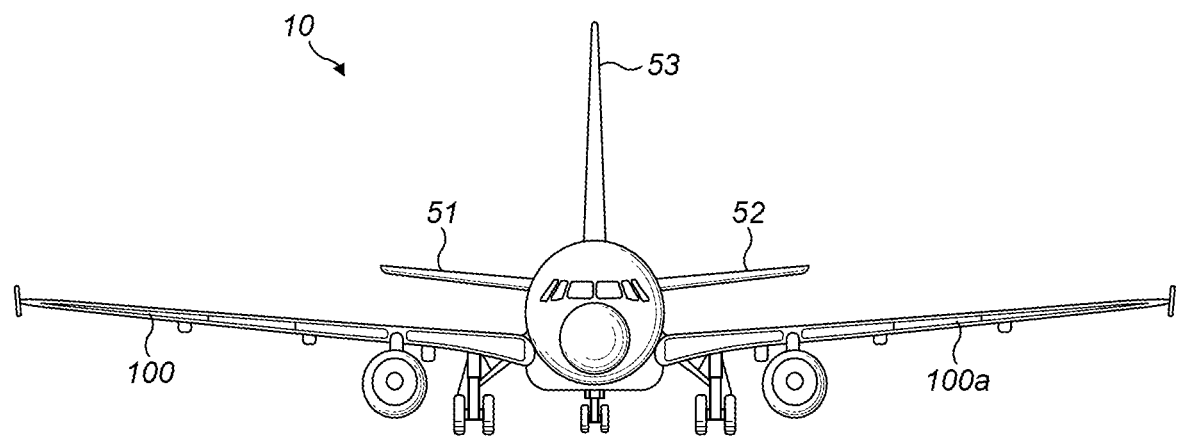
FIG. 1 shows a front view of an aircraft according to a first embodiment of the invention.

FIG. 1 shows a front view of an aircraft 10 including two aircraft wings 100, 100a according to a first embodiment of the invention. The aircraft also has two horizontal tailplane wings 51, 52 and a vertical tailplane wing 53.

Figure 2:
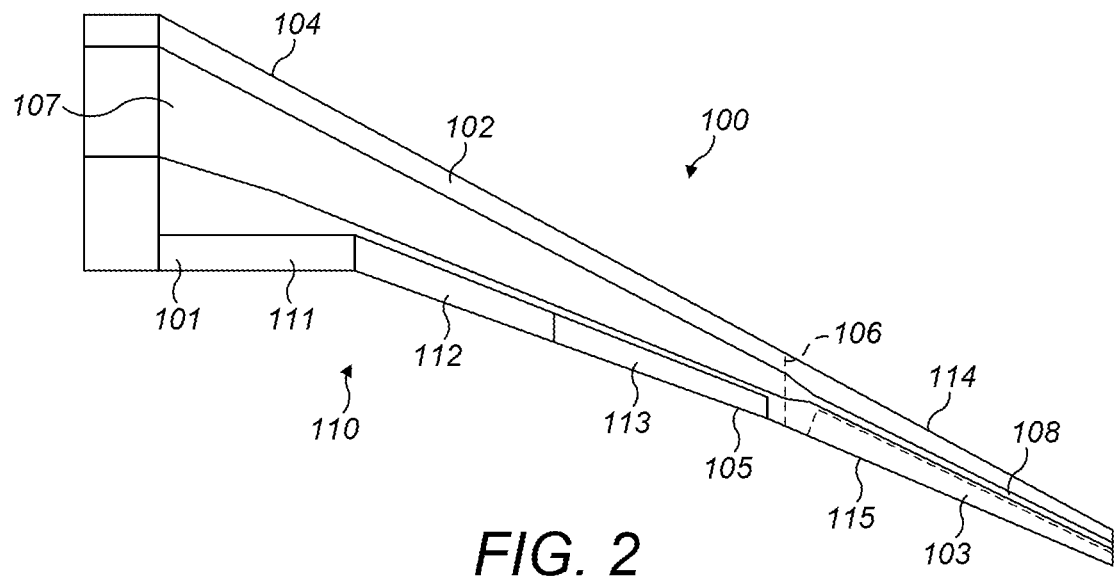
FIG. 2 shows a plan view of one of the wings of the aircraft of FIG. 1.

FIG. 2 shows a plan view of the starboard wing 100 of the aircraft of FIG. 1.

The wing 100 has a relatively large aspect ratio (span divided by mean chord). This aspect ratio is 16, with a span of 52 m. The wing comprises a root portion 101, a main portion 102 and a tip portion 103. The tip portion 103 is a foldable wing tip, foldable in relation to the main portion 102 at fold line 106. The wing has a leading edge 104 and a trailing edge 105.

The root portion 101 and main portion 102 are provided with a structural wing box 107. In the tip portion 103, the main load-bearing structure is provided by a structural spine, labelled as 108.

Various moveable control surfaces 110 are provided on the wing 100. These are inboard flap 111, intermediate flap 112 and outboard flap 113 in the root and main portions of the wing, and leading edge cambering device 114 and trailing edge cambering device 115 in the tip portion 103.

FIG. 3a shows a cross-sectional side view of a tip portion 103 of the wing of FIG. 2, with the trailing edge cambering device 115 in a neutral configuration.

Here, and in FIG. 3c, it can be seen that the structural spine 108 is in the form of a monolithic box structure 180, with a top 181, bottom 182 and leading and trailing sides 183, 184 respectively. The box 180 is 6 cm high (i.e. the length of sides 183, 184) and is 12 cm wide (i.e. the length of top and bottom 181, 182). It is formed from carbon fibre filament winding.

FIG. 3a shows the arrangement of the structures to provide an external shape/skin to the wing tip 103.

In particular, it can be seen that the trailing edge section has an upper skin structure 118 that extends over the top 181 of the box 180 and past the leading side of the box 180, where it if offset downwards. An upper skin structure 116 of the leading edge section 114 extends on top of this offset and is bolted to it with bolt 121.

The box structure 180 is provided with an external skin structure 124 extending under the bottom 182 of the box 180 and offset upwards where it extends past the leading and trailing sides 183, 184 of the box 180. A lower skin structure 117 of the leading edge 114 extends underneath the "leading side" offset and is bolted to it with bolt 122.

A lower skin structure 119 of the trailing edge 115 extends underneath the "trailing side" offset and is bolted to it with bolt 123.

A support bracket 125 is provided at the corner of the upper skin structure 118 of the trailing edge 115 and the trailing side 184 of the box 180.

Within the trailing edge 115 is a movement mechanism, generally denoted by 150. This movement mechanism 150 allows the trailing edge to move between an extreme upwards 161 and an extreme downwards 162 configuration. In FIG. 3a, the trailing edge 115 is in its neutral configuration 160 (halfway between the two extreme configurations).

The movement mechanism 150 comprises an upper internal bracket 151, attached to an inner surface of the upper skin structure 118 of the trailing edge 115. Similarly, there is a lower internal bracket 152, attached to an inner surface of the lower skin structure 119 of the trailing edge 115. Both brackets provide a pivotal mounting point 151a, 152a respectively.

More of the movement mechanism 150 is shown in FIG. 3b.

Here, it can be seen that the movement mechanism 150 further comprises a torque tube 153. The torque tube is rotationally mounted within the trailing edge 115. The torque tube 153 has an upper connector 154 that is pivotally connected to the pivot point 151a of the upper bracket 151. The torque tube 153 has a lower connector 155 that is pivotally connected to the pivot point 152a of the lower bracket 152. Hence, when the torque tube 153 rotates, the brackets 151, 152 are urged by the torque tube 153.

For example, if the torque tube 153 is rotated clockwise as we look at FIG. 3b, the upper bracket 151 is urged towards the front of the wing and the lower bracket 152 is urged towards the tail of the wing. However, as the skin structures 118, 119 are not able to elongate/stretch, instead the brackets 151, 152 move vertically. In particular, lower bracket 152 is urged downwards so as move into line with where the lower skin structure 119 is attached to the wing box 180. This allows the bracket 152 to also move towards the tail, as being urged by the torque tube 153. Similarly, the upper bracket 151 is urged downwards, away from the line where the upper skin structure 118 is attached to the wing box 180. Hence, overall, it can be seen that both upper and lower 118, 119 skin structures are pivoted downwards to the extreme downwards configuration 162 when the torque tube 153 is rotated clockwise.

On the other hand, if the torque tube 153 is rotated anti-clockwise as we look at FIG. 3b, the upper bracket 151 is urged towards the tail of the wing and the lower bracket 152 is urged towards the front of the wing. However, as the skin structures 118, 119 are not able to elongate/stretch, instead the brackets 151, 152 move vertically. In particular, upper bracket 151 is urged upwards so as move into line with where the upper skin structure 118 is attached to the wing box 180. This allows the bracket 151 to also move towards the tail, as being urged by the torque tube 153.

Similarly, the lower bracket 152 is urged upwards, away from the line where the lower skin structure 119 is attached to the wing box 180. Hence, overall, it can be seen that both upper and lower 118, 119 skin structures are pivoted upwards to the extreme upwards configuration 161 when the torque tube 153 is rotated anti-clockwise.

At a tail end of the trailing edge 115, it can be seen that the upper skin structure 118 and lower skin structure 119 do not meet and are not joined together. The upper skin structure 118 and lower skin structure 119 are spaced from each other at their respective tail ends. Providing a spacing between a tail end of the upper skin structure 118 and a tail end of the lower skin structure 119 avoids direct contact between the upper skin structure 118 and lower skin structure 119. The trailing edge 115 comprises two assemblies to maintain a closed wing tail and allow the two skin structures 118, 119 to move substantially horizontally with respect to each other, but not substantially vertically.

A first assembly 170 ensures a minimum distance between the upper and lower 118, 119 skin structures at the tail and provides a smooth sliding surface arrangement. A second assembly 180 ensures a maximum and minimum distance between the upper and lower 118, 119 skin structures at the tail.

The first assembly 170 is located at the very tail and comprises an upper wedge portion 171 provided on the internal surface of the upper skin structure 118 and a lower wedge portion 172 provided on the internal surface of the lower skin structure 119. These wedges portions 171, 172 abut each other along a long side and are able to slide over each other easily because the long sides of the wedge portions are provided with a Teflon coating.

The second assembly 180 is located internal (i.e. towards the front of the wing tip) to the wedge portions 171, 172. It is in the form of a connecting device to connect the upper and lower skin structures 118, 119 together so that they do not move vertically away from each other. In other words, the second assembly 180 ensures that the long sides of the wedge portions 171, 172 remain abutted against each other.

The second assembly 180 comprises a "C" shaped bracket 181 attached to the internal surface of the upper skin structure 118. The "C" bracket provides a substantially horizontal channel 182 for a pin bearing 183. The pin bearing 183 is attached to a pin bracket 184, which is attached to the internal surface of the lower skin structure 119. As the pin 183 cannot move vertically in relation to the "C" bracket, this prevents the upper and lower 118, 119 skin structures separating vertically.

Hence, when the torque tube is rotated clockwise, the upper and lower 118, 119 skin structures pivot downwards into the downwards configuration 162. As they do this, the second assembly 180 ensures the two skin structures stay vertically together and the first assembly 170 allows the two skin structures 118, 119 to slide with respect to each other.

When the torque tube is rotated anti-clockwise, the upper and lower 118, 119 skin structures pivot upwards into the upwards configuration 161. As they do this, the second assembly 180 ensures the two skin structures stay vertically together and the first assembly 170 allows the two skin structures 118, 119 to slide with respect to each other.

As can be seen in FIG. 3b, the ends of the skin structures 118, 119 are offset from each other in the upwards and downwards configurations 161, 162.

Figure 3D:
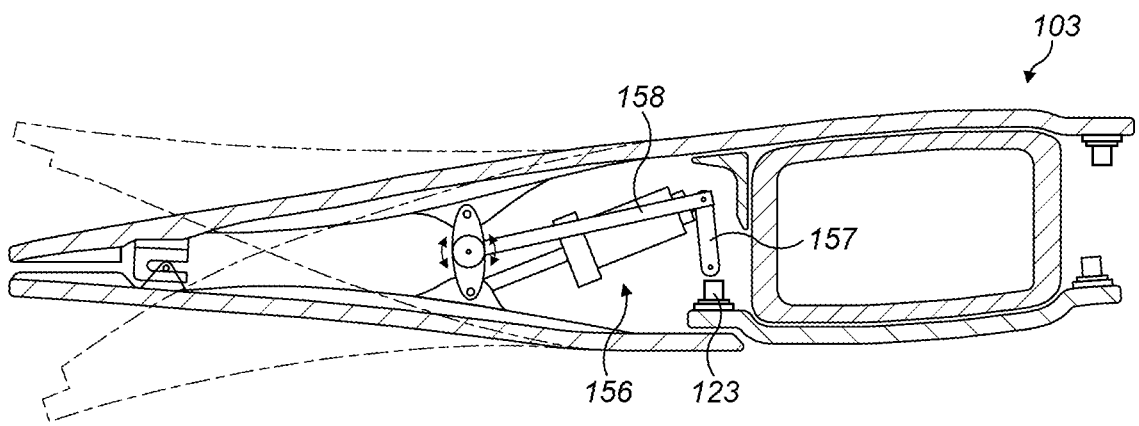
FIG. 3d shows the view of FIG. 3b additionally showing a piston arrangement for driving rotation of the torque tube.

FIG. 3d shows the view of FIG. 3b additionally showing a piston arrangement for driving rotation of the torque tube 153.

The arrangement includes a piston rod 156 connected between pivot point 152a at a first end and a short lever connected to the bolt 123 at a second end. Also at the second end is a lever 158 connected to the torque tube 153. Hence, movement of the piston rod in and out (shortening and lengthening the piston) causes the torque tube 153 to rotate clockwise and anti-clockwise.

Figure 4C:
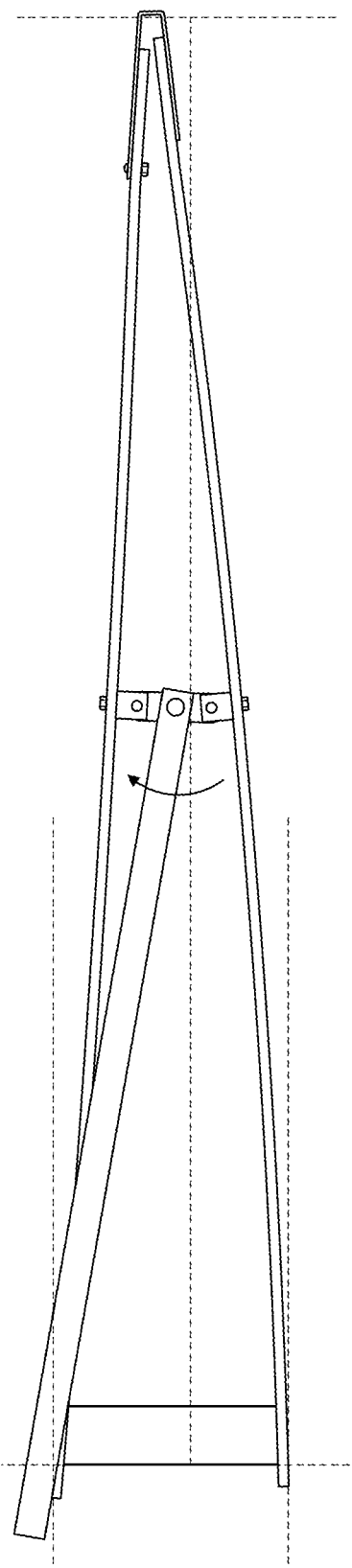
FIG. 4c shows the test model of FIGS. 4a and 4b in an upwards configuration.

FIG. 4a shows an equivalent view to a cross-sectional side view, showing a test model 20 of a trailing edge section in a neutral configuration. This test model 20 is similar in function and concept to that described in the preceding figures and the ideas and features of it could be applied to a wing. The same reference numerals, where appropriate, will be used. The differences will be described below.

The test model 20 uses an actuation bar 21 to actuate movement of a torque bar 22. The actuation bar 21 and torque bar 22 form a "T" shape. Movement of the torque bar 22 (like the torque tube 153) causes brackets 151, 152 to be urged forwards/backwards and so urges upwards (see FIG. 4c) or downwards (see FIG. 4b) movement of the upper and lower skin structures 118, 119.

A +/−9 degree rotation angle of the torque tube 153 results in a +/−25 mm deflection of the trailing edge. This corresponds to a +/−20 degree rotation of the trailing edge.

Figure 5:
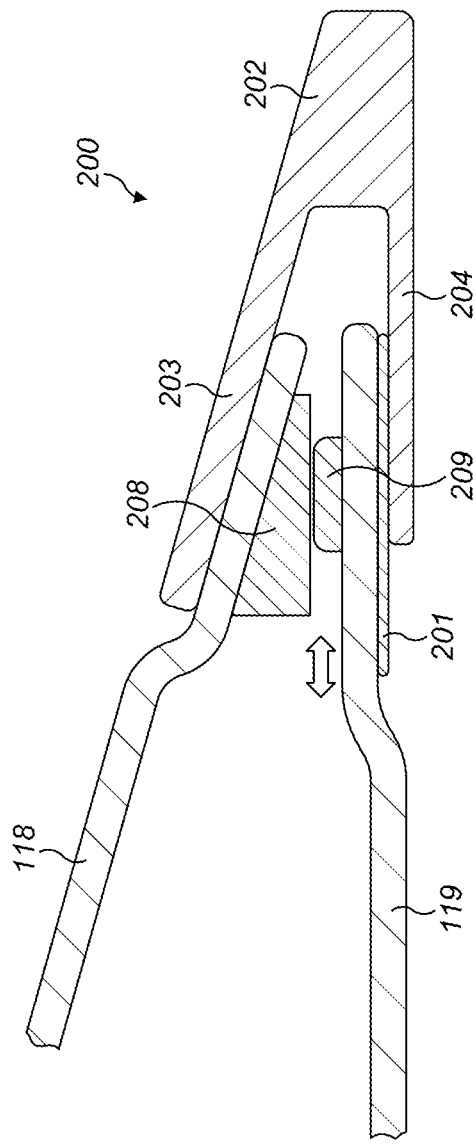
FIG. 5 shows a close-up schematic view of a cover arrangement, similar to that of the test model, suitable for use with wings according to the invention.

One major difference is the arrangement at the tail of the test model 20. Here, a cover or cap arrangement 200 over the tail is used, effectively replacing the first 170 and second 180 assemblies, as will be described in relation to FIG. 5.

Here, the tails of the upper and lower 118, 119 skin structures are offset inwards. On the external surface of the lower skin structure 119 tail, a Teflon plate 201 is attached. A "V" shaped cap 202 is then attached to the tail. A first side 203 of the "V" is fixedly attached to the external surface of the upper skin structure 119 tail (i.e. flush within the offset). The other side 204 of the "V" is placed externally to the Teflon plate 201 and able to slide in relation to it. Hence, the cap 202 and Teflon plate 201 help a smooth sliding motion between the upper and lower skin structures 118, 119 and also ensure they do not become separated vertically.

There is also a wedge arrangement comprising an internal upper wedge 208 (coated in Teflon) attached to the internal surface of the upper skin structure 118 and a Teflon coated plate 209 attached to the internal surface of the lower skin structure 119. The wedge 208 and plate 209 abut each other and maintain a minimum vertical separation between the upper and lower 118, 119 skin structures.

Hence, the wedge arrangement 208, 209 and cap 202 perform the same functions (maintain vertical positioning and allowing sliding) as the first and second assemblies 170, 180 of the first embodiment.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

Any and all brackets and attachments described may be formed integrally.

Any suitable low-friction coating, not just Teflon, may be used.

Any suitable shape cap or brackets may be used.

Instead of a piston rod, any suitable actuator may be used. For example, comprising a gearbox. The gearbox may be located at an inboard end of the wing or wing tip, where more internal space is available.

In the examples given, a main wing is being considered. However, the invention is equally applicable to the wing sections of, for example, the horizontal or vertical tailplane wings.

In the examples given, movement of a trailing edge is being considered. However, the invention is equally applicable to movement of a leading edge.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

It should be noted that throughout this specification, "or" should be interpreted as "and/or".

Although the invention has been described above mainly in the context of a fixed-wing aircraft application, it may also be advantageously applied to various other applications, including but not limited to applications on vehicles such as helicopters, drones, trains, automobiles and spacecraft.

The invention claimed is:

1. An aircraft wing trailing edge section assembly comprising:
   an upper skin structure providing an upper external aerodynamic trailing edge surface,
   a lower skin structure providing a lower external aerodynamic trailing edge surface, and
   a movement mechanism comprising:
      a first portion attached to an internal surface of the upper skin structure,
      a second portion attached to an internal surface of the lower skin structure, and
      a rotationally mounted connector member connected between the first and second portions,
   a cap having a first side and a second side, wherein the first side is attached to an end of the upper skin structure and the second side is in sliding contact with an end of the lower skin structure,
      whereby the rotational movement of the connector member causes simultaneous movement of both first and second portions and therefore the lower skin structure relative to the upper skin structure within the cap, such that the camber of the trailing edge section is changed.

2. An aircraft wing trailing edge section assembly as claimed in claim 1, wherein the connector member is pivotally connected to the first and second portions.

3. An aircraft wing trailing edge section assembly as claimed in claim 1, wherein movement of the connector member causes the first portion to move in a first direction and the second portion to move in a second, opposite direction.

4. An aircraft wing trailing edge section assembly as claimed in claim 1, wherein the connector member extends along a span of the aircraft wing trailing edge section and wherein the aircraft wing trailing edge section further includes additional pairs of first and second portions attached to the upper and lower skin, distributed along the span of the aircraft wing trailing edge section and wherein the connector member is connected between each pair of first and second portions.

5. An aircraft wing trailing edge section assembly as claimed in claim 1, further comprising a slide connection mechanism, including:
   a first slide part attached to the upper skin structure, and
   a second slide part attached to the lower skin structure,
      wherein the first and second wedge portions are configured to allow relative movement between them in a fore-aft orientation and to constrain relative movement between them in a substantially vertical and/or horizontal orientation.

6. An aircraft wing trailing edge section assembly as claimed in claim 5, wherein the first and second slide parts form a slide channel and slider pair, the slider configured to slide within the slide channel.

7. An aircraft wing trailing edge section assembly as claimed in claim 5, wherein the first and second slide parts are located on internal surfaces of the upper and lower skin and wherein the slide parts act to pull the upper and lower skin towards each other.

8. An aircraft wing trailing edge section assembly as claimed in claim 5, wherein the first and second slide parts are located on the upper and lower external aerodynamic trailing edge surfaces and wherein the slide parts act to push the upper and lower skin towards each other.

9. An aircraft wing trailing edge section assembly as claimed in claim 1, wherein the connector member is connected to an actuator, for actuating movement of the connector member.

10. An aircraft wing trailing edge section assembly as claimed in claim 9, wherein the actuator is configured for attaching to an aircraft wing central section.

11. An aircraft wing section assembly, including the aircraft wing trailing edge section assembly as claimed in claim 10 and an aircraft wing central section, and wherein the actuator is attached to the aircraft wing central section.

12. An aircraft wing section assembly as claimed in claim 11, wherein one of the upper and lower skin of the trailing edge section is integral to the aircraft wing central section and wherein the other of the upper and lower skin of the trailing edge section is removably attached to the aircraft wing central section.

13. An aircraft wing trailing edge section assembly according to claim 1, wherein the movement mechanism further comprises a torque tube rotatably to an upper bracket attached to the internal surface of the upper skin structure at a first end, and a lower bracket attached to the internal surface of the lower skin structure at a second.

14. An aircraft comprising the aircraft wing trailing edge section assembly of claim 1.

15. A method of operating an aircraft, comprising the following steps:
   providing an upper skin trailing edge structure with an upper external aerodynamic trailing edge surface, and an internal surface, having a first wedge portion attached to the internal surface,
   providing a lower skin trailing edge structure providing a lower external aerodynamic trailing edge surface, and an internal surface, having a second wedge portion attached to the internal surface, and
   providing a cap having a first side and a second side, wherein the first side is attached to an end of the upper skin structure and the second side is in sliding contact with an end of the lower skin structure, actuating movement of a connector member connected to the first and second portions, thereby causing simultaneous movement of both first and second portions and therefore the lower skin structure relative to the upper skin structure within the cap, such that the camber of the trailing edge section is changed.

16. A method of operating an aircraft, as claimed in claim 15, wherein movement of the connector member causes the first portion to move in a first direction and the second portion to move in a second, opposite direction.

* * * * *